United States Patent
Horikawa et al.

(10) Patent No.: US 10,302,304 B2
(45) Date of Patent: May 28, 2019

(54) FUEL INJECTOR AND GAS TURBINE

(71) Applicant: KAWASAKI JUKOGYO KABUSHIKI KAISHA, Hyogo (JP)

(72) Inventors: Atsushi Horikawa, Akashi (JP); Kunio Okada, Kakogawa (JP); Seiji Yamashita, Kobe (JP); Masahide Kazari, Akashi (JP); Takeo Oda, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 321 days.

(21) Appl. No.: 15/508,708

(22) PCT Filed: Sep. 28, 2015

(86) PCT No.: PCT/JP2015/004907
§ 371 (c)(1),
(2) Date: Mar. 3, 2017

(87) PCT Pub. No.: WO2016/051756
PCT Pub. Date: Apr. 7, 2016

(65) Prior Publication Data
US 2017/0299188 A1    Oct. 19, 2017

(30) Foreign Application Priority Data

Sep. 29, 2014 (JP) .................. 2014-198176

(51) Int. Cl.
*F23R 3/10* (2006.01)
*F02C 3/04* (2006.01)
(Continued)

(52) U.S. Cl.
CPC ............... *F23R 3/286* (2013.01); *F02C 3/04* (2013.01); *F23R 3/10* (2013.01); *F23R 3/28* (2013.01);
(Continued)

(58) Field of Classification Search
CPC ...... F02C 7/22; F02C 3/04; F23R 3/10; F23R 3/12; F23R 3/28; F23R 3/286; F05D 2220/32; F05D 2240/35
See application file for complete search history.

(56) References Cited

U.S. PATENT DOCUMENTS 2,548,087 A * 4/1951 Williams .................. F23R 3/32
60/738
2,566,788 A * 9/1951 Berggren .............. F23D 11/107
239/404
(Continued)

FOREIGN PATENT DOCUMENTS

JP    H06-213450 A    8/1994
JP    H07-091661 A    4/1995
(Continued)

OTHER PUBLICATIONS

Written Opinion issued in PCT/JP2015/004907; dated Dec. 15, 2015.
(Continued)

*Primary Examiner* — Todd E Manahan
*Assistant Examiner* — Eric W Linderman
(74) *Attorney, Agent, or Firm* — Studebaker & Brackett PC (57) ABSTRACT

A fuel injector (23) comprises a cylindrical passage (32) which opens in a combustion chamber (26), a fuel introduction passage (34) which guides fuel to a region of the cylindrical passage (32) which is closer to the combustion chamber (26), and an air introduction passage (35) which guides compressed air to the cylindrical passage (32) at a location that is upstream of a location at which the fuel is introduced to the cylindrical passage (32), wherein the fuel
(Continued)

introduction passage (34) guides the fuel in a tangential direction of the cylindrical passage (32) in a transverse sectional view.

6 Claims, 10 Drawing Sheets

(51) Int. Cl.
  *F02C 7/22* (2006.01)
  *F23R 3/28* (2006.01)
  *F23R 3/12* (2006.01)

(52) U.S. Cl.
  CPC ............ *F02C 7/22* (2013.01); *F05D 2220/32* (2013.01); *F05D 2240/35* (2013.01); *F23D 2206/10* (2013.01); *F23R 3/12* (2013.01)

(56) References Cited

U.S. PATENT DOCUMENTS

| | | | | |
|---|---|---|---|---|
| 4,891,936 A * | 1/1990 | Shekleton | ............... | F23R 3/04 60/746 |
| 5,109,671 A * | 5/1992 | Haasis | ............... | F23R 3/06 60/757 |
| 5,303,554 A * | 4/1994 | Faulkner | ............... | F23R 3/14 60/737 |
| 5,363,644 A * | 11/1994 | Shekleton | ............... | F23R 3/04 60/760 |
| 5,402,633 A * | 4/1995 | Hu | ............... | B01F 5/0451 60/737 |
| 5,423,674 A * | 6/1995 | Knopfel | ............... | F23C 7/002 431/115 |
| 5,489,203 A * | 2/1996 | Dobbeling | ............... | F23C 7/002 431/173 |
| 5,588,826 A * | 12/1996 | Dobbeling | ............... | F23D 11/402 239/402 |
| 5,735,687 A * | 4/1998 | Knopfel | ............... | F23C 7/002 431/115 |
| 5,791,894 A * | 8/1998 | Dobbeling | ............... | F23C 7/002 431/350 |
| 5,829,967 A * | 11/1998 | Chyou | ............... | F15D 1/0015 431/350 |
| 6,098,406 A * | 8/2000 | Bolis | ............... | F23C 7/002 431/353 |
| 6,189,314 B1 * | 2/2001 | Yamamoto | ............... | F23R 3/12 60/737 |
| 6,769,903 B2 * | 8/2004 | Eroglu | ............... | F23C 7/002 431/12 |
| 7,565,794 B2 * | 7/2009 | Eroglu | ............... | F23C 7/002 60/39.463 |
| 7,780,437 B2 * | 8/2010 | Bernero | ............... | F23R 3/286 431/12 |
| 7,913,494 B2 * | 3/2011 | Hiromitsu | ............... | F23C 7/002 239/399 |
| 8,112,999 B2 * | 2/2012 | Zuo | ............... | F23D 14/78 60/730 |
| 8,545,215 B2 * | 10/2013 | Bhagat | ............... | F23D 11/103 239/423 |
| 9,038,392 B2 * | 5/2015 | Yuasa | ............... | F23R 3/12 60/737 |
| 9,534,781 B2 * | 1/2017 | Hughes | ............... | F23N 3/082 |
| 10,072,846 B2 * | 9/2018 | Monahan | ............... | F23R 3/286 |
| 2004/0139748 A1 * | 7/2004 | Dittmann | ............... | F23C 7/002 60/772 |
| 2007/0029408 A1 * | 2/2007 | Hewitt | ............... | B05B 1/3426 239/463 |
| 2012/0291446 A1 * | 11/2012 | Hirata | ............... | F23D 11/402 60/772 |
| 2013/0025285 A1 * | 1/2013 | Stewart | ............... | F02C 7/2365 60/740 |
| 2013/0232979 A1 * | 9/2013 | Singh | ............... | F23R 3/10 60/737 |
| 2016/0169523 A1 * | 6/2016 | Okada | ............... | F02C 3/30 60/740 |
| 2017/0184307 A1 * | 6/2017 | Patel | ............... | F23R 3/28 |
| 2018/0135521 A1 * | 5/2018 | Jung | ............... | F02C 7/222 |

FOREIGN PATENT DOCUMENTS

| | | |
|---|---|---|
| JP | 2000-074373 A | 3/2000 |
| JP | 2010-216668 A | 9/2010 |
| JP | 2013-190201 A | 9/2013 |

OTHER PUBLICATIONS

International Preliminary Report on Patentability of the International Searching Authority; PCT/JP2015/004907; dated Apr. 4, 2017.

International Search Report issued in PCT/JP2015/004907; dated Dec. 15, 2015.

\* cited by examiner

FUEL INJECTOR AND GAS TURBINE

TECHNICAL FIELD

The present invention relates to a fuel injector and a gas turbine.

BACKGROUND ART

For environment protection purposes, it is desirable to reduce a nitrogen oxide (NOx) exhausted from a gas turbine. As a method of reducing the exhaust amount of NOx, there is a method in which fuel and compressed air are fully mixed (perfectly pre-mixed), and the resulting air-fuel mixture is injected from a fuel injector and combusted. In accordance with this method, since combustion is performed quickly, an increase in a combustion temperature can be suppressed. Therefore, generation of NOx (thermal NOx) due to the increase in the combustion temperature can be suppressed (see Patent Literature 1).

CITATION LIST

Patent Literature

Patent Literature 1: Japanese Laid-Open Patent Application Publication No. 2010-216668

SUMMARY OF INVENTION

Technical Problem

If the fuel and the compressed air are pre-mixed in large amounts in the interior of the fuel injector, a "flashback flame" may occur, in which a flame propagates from a combustion chamber to the fuel injector, and cause burning damages to the fuel injector. In particular, in a case where a gas with a high reactivity, such as a hydrogen gas, is used as the fuel, the flashback flame tends to occur.

In view of the above-described circumstances, the present invention has been developed. An object of the present invention is to provide a fuel injector which can reduce the generation amount of NOx and suppress the occurrence of a flashback flame.

Solution to Problem

A fuel injector of the present invention comprises a cylindrical passage which opens in a combustion chamber; a fuel introduction passage which guides fuel to a region of the cylindrical passage which is closer to the combustion chamber; and an air introduction passage which guides compressed air to the cylindrical passage at a location that is upstream of a location at which the fuel is introduced to the cylindrical passage, wherein the fuel introduction passage guides the fuel in a tangential direction of the cylindrical passage in a transverse sectional view.

In accordance with this configuration, the fuel is injected into the combustion chamber while swirling along the inner peripheral surface of the cylindrical passage, and is formed in a sheet shape (a spiral band shape) in the interior of the combustion chamber. At this time, the surface area of the fuel as a series of substances is large, and a distance between the outer surface of the fuel and the center of the fuel is short. This makes it possible to shorten combustion reaction time, and reduce the generation amount of NOx. Since the compressed air flows from the cylindrical passage toward the combustion chamber, it becomes possible to suppress a combustion gas from becoming stagnant in the vicinity of the exit of the cylindrical passage, and stable combustion can be carried out. Further, since the fuel and the air are not pre-mixed in large amounts in the interior of the fuel injector, the occurrence of a flashback flame can be suppressed.

In the above-described fuel injector, the air introduction passage may have a configuration which causes the compressed air to swirl in the same direction as a direction in which the fuel swirls, in an interior of the cylindrical passage. In accordance with this configuration, the swirling of the fuel is facilitated by the swirling compressed air. Therefore, the fuel can be formed in the sheet shape with a higher reliability.

In the above-described fuel injector, the fuel introduction passage may guide the fuel in a direction that is inclined toward the combustion chamber with respect to a direction perpendicular to a center axis of the cylindrical passage. In accordance with this configuration, hydrogen is less likely to become stagnant in the vicinity of the exit of the cylindrical passage. Therefore, the risk of occurrence of the flashback flame can be reduced even when a gas with a high reactivity, such as a hydrogen gas, is used.

According to another aspect of the present invention, a fuel injector comprises a plurality of cylindrical passages which open in a combustion chamber; a plurality of fuel introduction passages which guide fuel to regions of the plurality of cylindrical passages, respectively, which are closer to the combustion chamber; and a plurality of air introduction passages which guide compressed air to the plurality of cylindrical passages, respectively, at locations that are upstream of locations at which the fuel is introduced to the plurality of cylindrical passages, wherein the fuel introduction passages guide the fuel in tangential directions of the cylindrical passages, in transverse sectional views, respectively.

A gas turbine of the present invention comprises any one of the above-described fuel injectors.

Advantageous Effects of Invention

As described above, in accordance with the above-described fuel injector, it becomes possible to reduce the generation amount of NOx and suppress the occurrence of a flashback flame.

DESCRIPTION OF EMBODIMENTS

Hereinafter, the embodiment of the present invention will be described with reference to the drawings. Throughout the drawings, the same or corresponding components are designated by the same reference symbols and will not be described repeatedly.

<Configuration of Gas Turbine>

Figure 1:
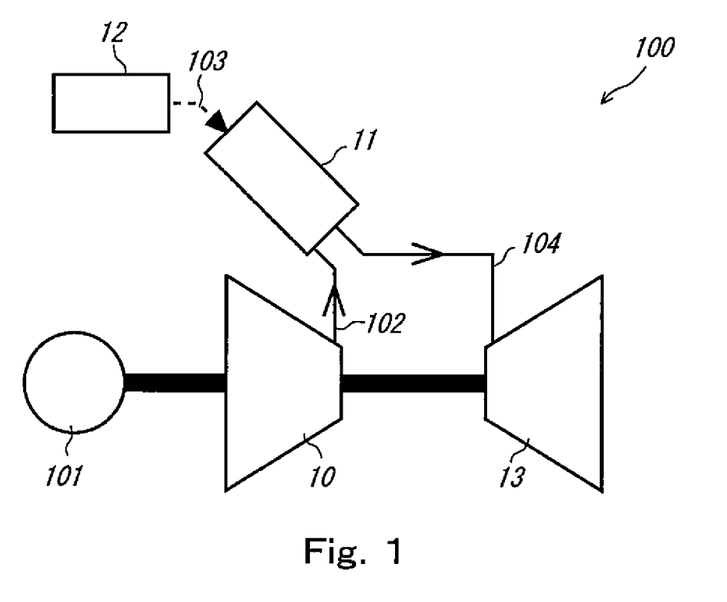
FIG. 1 is a view schematically showing the overall configuration of a gas turbine.

First of all, the overall configuration of a gas turbine 100 will be described. FIG. 1 is a view schematically showing the configuration of the gas turbine 100. The gas turbine 100 of the present embodiment is a gas turbine for power generation, which drives a power generator 101. The gas turbine 100 includes a compressor 10, a combustor 11, a fuel supply device 12, and a turbine 13.

Compressed air 102 is supplied from the compressor 10 to the combustor 11. Fuel 103 is supplied from the fuel supply device 12 to the combustor 11. In the present embodiment, it is supposed that a hydrogen gas with a high reactivity is used as the fuel 103. Alternatively, the fuel 103 may be a natural gas, liquefied hydrogen, or the like. In the interior of the combustor 11, the fuel 103 and the compressed air 102 are combusted. A combustion gas 104 in a high-temperature and high-pressure state generated by the combustion is supplied to the turbine 13. The turbine 13 rotates by energy of the combustion gas 104 and drives the power generator 101 via the compressor 10.

<Configuration of Combustor>

Figure 2:
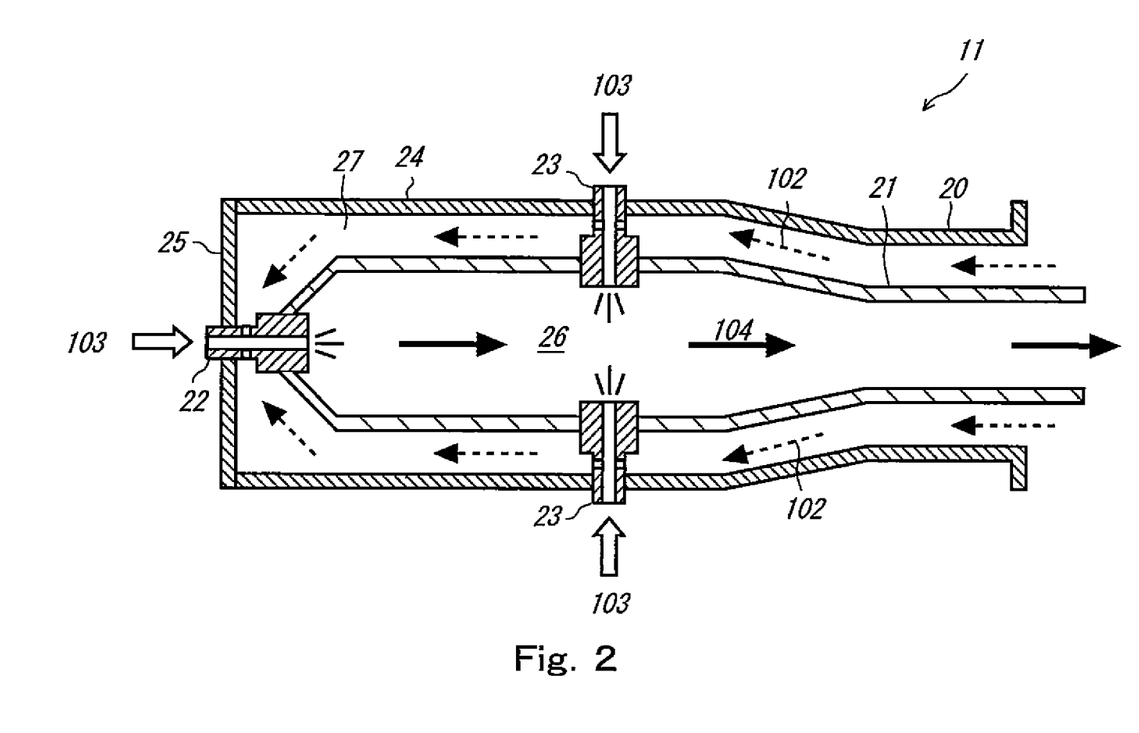
FIG. 2 is a view schematically showing the configuration of a combustor.

Next, the combustor 11 will be described more specifically. FIG. 2 is a cross-sectional view schematically showing the combustor 11. The combustor 11 of the present embodiment is of a reverse flow can type in which the compressed air 102 and the combustion gas 104 flow in opposite directions. The combustor 11 includes a housing 20, a combustion tube 21, a main fuel injector 22, and supplemental fuel injectors 23. Alternatively, the combustor 11 may have a structure different from the reverse flow can type.

The housing 20 is a member defining the contour of the combustor 11. The housing 20 includes a cylindrical outer pipe member 24, and a disc-shaped end cover 25 provided at an end portion of the outer pipe member 24 on a first side (left side in FIG. 2).

The combustion tube 21 is housed inside the housing 20. A combustion chamber 26 is formed inside the combustion tube 21. In the interior of the combustion chamber 26, the fuel 103 and the compressed air 102 are combusted to generate the combustion gas 104. The generated combustion gas 104 flows to the right side in FIG. 2 and is supplied to the turbine 13 (see FIG. 1). Between the combustion tube 21 and the housing 20, an annular air passage 27 is formed. The compressed air 102 supplied from the compressor 10 flows through the air passage 27 and toward the main fuel injector 22 (toward the left side in FIG. 1).

The main fuel injector 22 is mounted to the end cover 25 of the housing 20 to extend through the air passage 27 in the axial direction of the combustor 11. The main fuel injector 22 is configured to take in the compressed air 102 which has flowed through the air passage 27. The main fuel injector 22 injects the fuel 103 supplied from the fuel supply device 12 and the taken-in compressed air 102 into the combustion chamber 26 at the same time. Although in FIG. 2, one main fuel injector 22 is shown, a plurality of main fuel injectors 22 may be provided. Further, a pilot fuel injector which injects the fuel in a small amount may be provided, separately from the main fuel injector 22.

The supplemental fuel injectors 23 are mounted to the outer pipe member 24 of the housing 20 to extend through the air passage 27 in the radial direction of the combustor 11. The supplemental fuel injectors 23 are configured to be capable of taking in a part of the compressed air 102 flowing through the air passage 27. The supplemental fuel injectors 23 inject the fuel 103 supplied from the fuel supply device 12 and the taken-in compressed air 102 into the combustion chamber 26 at the same time. In the present embodiment, the plurality of supplemental fuel injectors 23 are arranged at equal intervals (e.g., intervals of 90 degrees) in the circumferential direction of the combustor 11.

<Configuration of Fuel Injector>

Next, the configurations of the supplemental fuel injectors 23 will be described in detail. Each of the supplemental fuel injectors 23 of the present embodiment is a fuel injector which injects the fuel 103 in a sheet shape (hereinafter this fuel injector will be referred to as the fuel injector which uses "sheet injection method"). Although a case where the supplemental fuel injectors 23 are the fuel injectors which use the sheet injection method will be described below, both the main fuel injector 22 and the supplemental fuel injectors 23 may be the fuel injectors which use the sheet injection method, or only the main fuel injector 22 may be the fuel injector which uses the sheet injection method.

Figure 3:
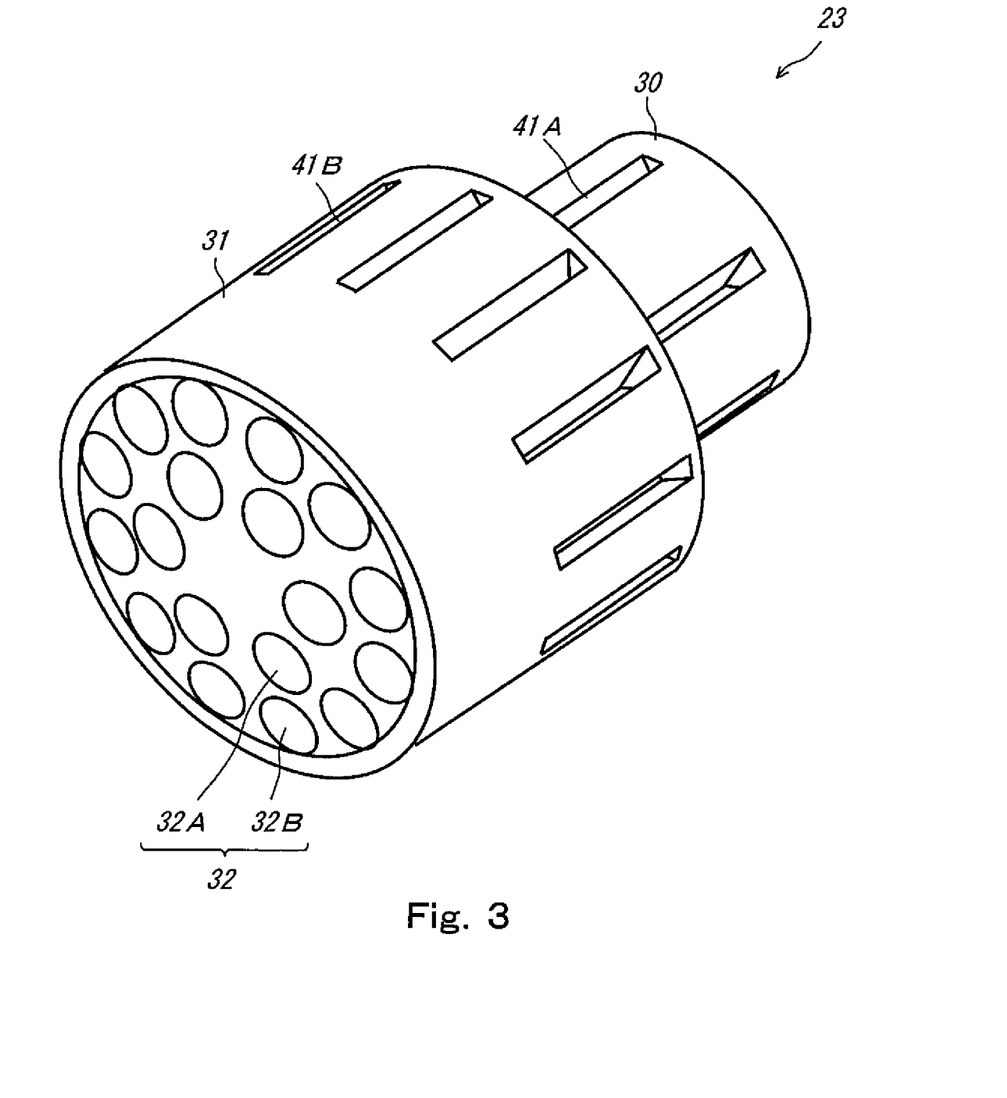
FIG. 3 is a perspective view of a supplemental fuel injector.
Figure 4:
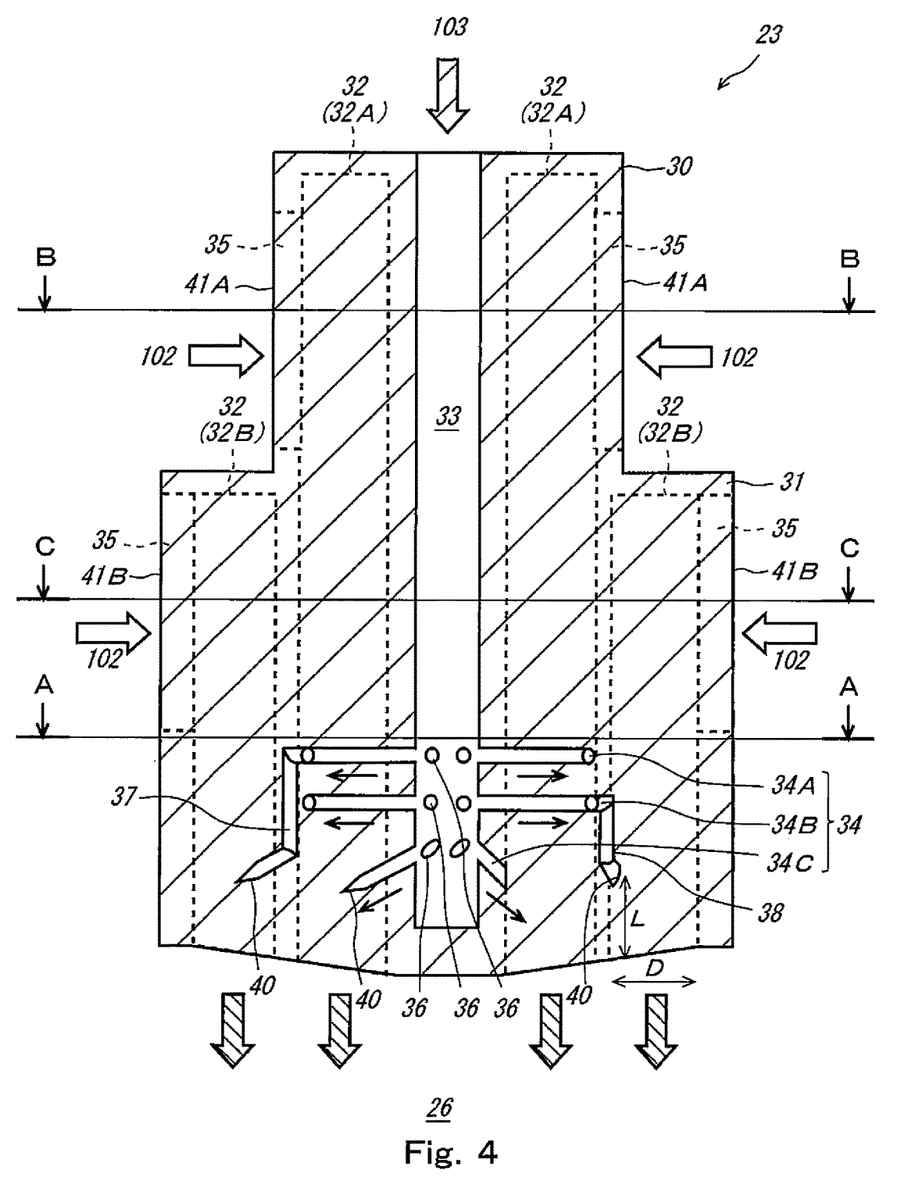
FIG. 4 is a longitudinal sectional view of the supplemental fuel injector.

FIG. 3 is a perspective view of the supplemental fuel injector 23. FIG. 4 is a longitudinal sectional view of the supplemental fuel injector 23. As shown in FIG. 3, the supplemental fuel injector 23 includes a first cylindrical section 30 located on a base end side (right upper side in FIG. 3), and a second cylindrical section 31 located on a tip end side (left lower side in FIG. 3) and having a diameter larger than that of the first cylindrical section 30.

As shown in FIG. 4, the supplemental fuel injector 23 includes a plurality of cylindrical passages 32 extending in the axial direction of the supplemental fuel injector 23, a fuel passage 33, a plurality of fuel introduction passages 34, and a plurality of air introduction passages 35.

The cylindrical passages 32 are passages which introduce the fuel 103 and the compressed air 102 into the combustion chamber 26, while the fuel 103 and the compressed air 102 are swirling. The cylindrical passages 32 open in the combustion chamber 26. As shown in FIG. 3, among the plurality of cylindrical passages 32, six inner cylindrical passages 32A are arranged in the circumferential direction around the center axis of the supplemental fuel injector 23, while twelve outer cylindrical passages 32B are arranged in the circumferential direction around the center axis of the supplemental fuel injector 23 and located outward relative to the inner cylindrical passages 32A.

As shown in FIG. 4, the inner cylindrical passages 32A are formed to extend over the first cylindrical section 30 and the second cylindrical section 31, while the outer cylindrical passages 32B are formed to extend only in the second cylindrical section 31. Although in the present embodiment, the cylindrical passages 32 extend in parallel with each other, the cylindrical passages 32 may not necessarily extend in parallel with each other. For example, only the inner cylindrical passages 32A may extend in the axial direction, while the outer cylindrical passages 32B may extend radially outward to be inclined with respect to the axial direction.

The fuel passage 33 is a passage which delivers the fuel 103 supplied from the fuel supply device 12 (see FIG. 1) to the plurality of fuel introduction passages 34 which branch from the fuel passage 33. As shown in FIG. 4, the fuel passage 33 is located on the center axis of the supplemental fuel injector 23 and extends in the axial direction. As shown in FIG. 4, the inner peripheral surface of the fuel passage 33 is formed with six fuel discharge ports 36 at equal intervals in the circumferential direction at three different axial locations. The fuel introduction passages 34 are connected to the fuel discharge ports 36, respectively. In this structure, the fuel 103 in the interior of the fuel passage 33 flows to the fuel introduction passages 34 through the fuel discharge ports 36. Although in the present embodiment, only one fuel passage 33 is formed, a plurality of fuel passages 33 may be formed.

Figure 5:
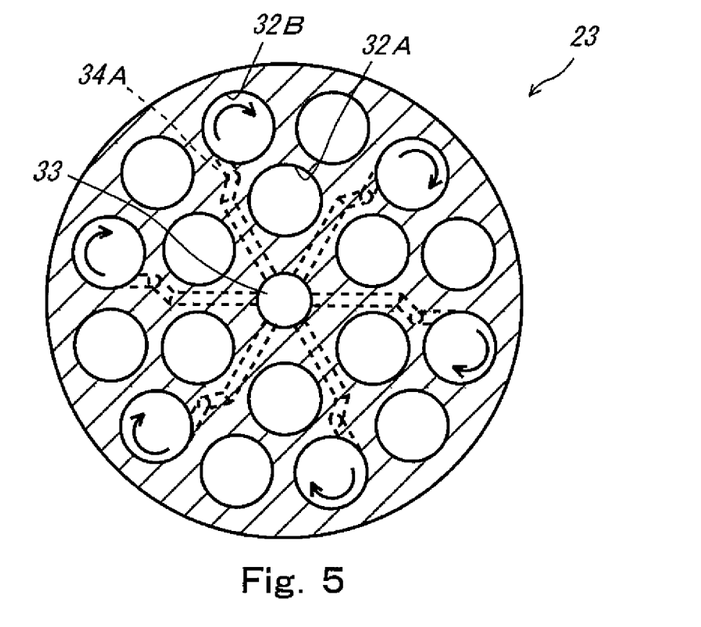
FIG. 5 is a cross-sectional view taken in the direction of arrows along line A-A of FIG. 4, showing a first fuel introduction passage.
Figure 6:
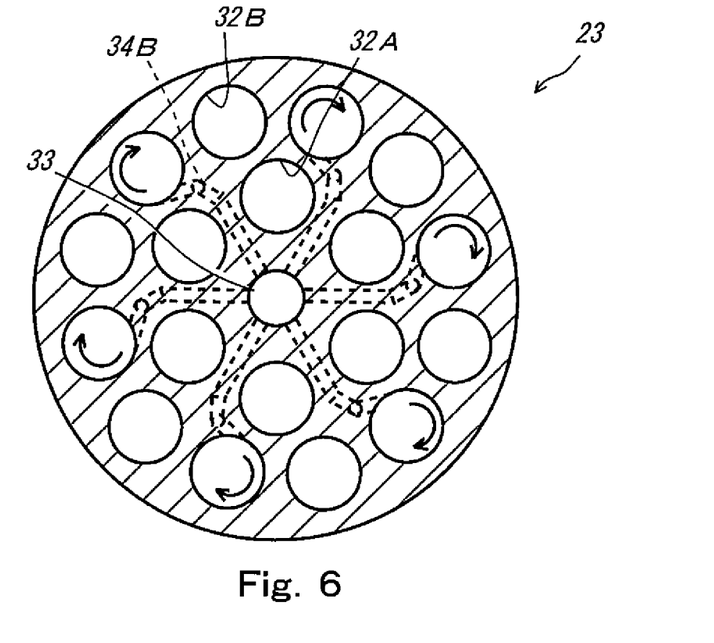
FIG. 6 is a cross-sectional view taken in the direction of arrows along line A-A of FIG. 4, showing a second fuel introduction passage.
Figure 7:
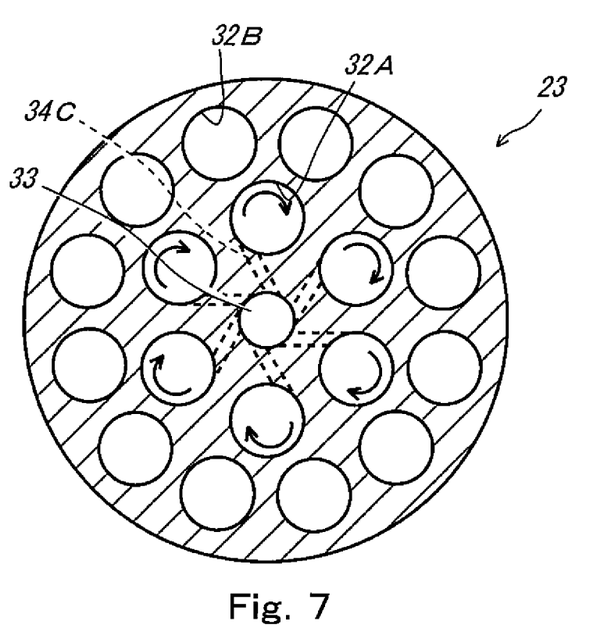
FIG. 7 is a cross-sectional view taken in the direction of arrows along line A-A of FIG. 4, showing a third fuel introduction passage.

The fuel introduction passages 34 are passages which guide the fuel 103 to the cylindrical passages 32. In the description below, the fuel introduction passages 34 will be referred to as "first fuel introduction passages 34A", "second fuel introduction passages 34B", and "third fuel introduction passages 34C", respectively, in the order in which a distance between the fuel discharge ports 36 to which the fuel introduction passages 34 are connected and the combustion chamber 26 decreases. FIGS. 5 to 7 are cross-sectional views taken in the direction of arrows along line A-A of FIG. 4, showing the first fuel introduction passages 34A, the second fuel introduction passages 34B, and the third fuel introduction passages 34C, respectively.

As shown in FIG. 5, the first fuel introduction passages 34A extend from the fuel passage 33 to the six outer cylindrical passages 32B, respectively, among the twelve outer cylindrical passages 32B. The downstream end portions of the first fuel introduction passages 34A are connected to the outer cylindrical passages 32B, respectively in such a manner that the downstream end portions of the first fuel introduction passages 34A extend in the tangential directions of the cylindrical passages 32, in cross-sectional views, respectively. The downstream end portions of the first fuel introduction passages 34A extend substantially in parallel with the radial direction of the supplemental fuel injector 23.

As shown in FIG. 6, the second fuel introduction passages 34B extend from the fuel passage 33 to the six outer cylindrical passages 32B, respectively, to which the first fuel introduction passages 34A are not connected, among the twelve outer cylindrical passages 32B. In the present embodiment, the outer cylindrical passages 32B are provided in such a manner that the outer cylindrical passage 32B to which the first fuel introduction passage 34A is connected and the outer cylindrical passage 32B to which the second fuel introduction passage 34B is connected are arranged alternately in the circumferential direction of the supplemental fuel injector 23. The downstream end portions of the second fuel introduction passages 34B are connected to the outer cylindrical passages 32B, respectively in such a manner that the downstream end portions of the second fuel introduction passages 34B extend in the tangential directions of the outer cylindrical passages 32B, in cross-sectional views, respectively. Note that the downstream end portions of the second fuel introduction passages 34B extend in a direction that is inclined with respect to the radial direction of the supplemental fuel injector 23, differently from the downstream end portions of the first fuel introduction passages 34A.

As shown in FIG. 7, the third fuel introduction passages 34C extend from the fuel passage 33 to the six inner cylindrical passages 32A, respectively. The downstream end portions of the third fuel introduction passages 34C are connected to the inner cylindrical passages 32A, respectively in such a manner that the downstream end portions of the third fuel introduction passages 34C extend in the tangential directions of the inner cylindrical passages 32A, in cross-sectional views, respectively. The downstream end portions (fuel injection ports 40) of the first fuel introduction passages 34A, the downstream end portions (fuel injection ports 40) of the second fuel introduction passages 34B, and the downstream end portions (fuel injection ports 40) of the third fuel introduction passages 34C are located in the regions of the cylindrical passages 32 which are close to the combustion chamber 26. The phrase "the regions located in the cylindrical passages 32 which are close to the combustion chamber 26" may be the regions closest to the combustion chamber 26 in a case where the cylindrical passages 32 are equally divided into three regions in the axial direction or the regions closest to the combustion chamber 26 in a case where the cylindrical passages 32 are equally divided into two regions in the axial direction.

As described above, the downstream end portions of all of the fuel introduction passages 34 are connected to the cylindrical passages 32, respectively in such a manner that the downstream end portions of the fuel introduction passages 34 extend in the tangential directions of the cylindrical passages 32, in the cross-sectional views, respectively. In this structure, the fuel 103 is introduced to the cylindrical passages 32 from the tangential directions of the cylindrical passages 32, in the cross-sectional views (transverse sectional views) perpendicular to the center axes of the cylindrical passages 32. Thus, the fuel 103 having been introduced into the cylindrical passages 32 swirl (swirl in a clockwise direction in FIGS. 5 to 7) along the inner peripheral surfaces of the cylindrical passages 32, and thereafter are injected into the combustion chamber 26. In this way, the fuel 103 swirl along the inner peripheral surfaces of the cylindrical passages 32, and thereby is formed in the sheet shape.

As shown in FIG. 4, the first fuel introduction passages 34A include first longitudinal passage sections 37 extending in the axial direction, respectively, while the second fuel introduction passages 34B include second longitudinal passage sections 38, respectively, which extend in the axial direction, respectively, and are shorter than the first longitudinal passage sections 37. On the other hand, the third fuel introduction passages 34C do not include passage sections extending in the axial direction. With this configuration of the fuel introduction passages 34, in all of the cylindrical passages 32, the fuel injection ports 40 through which the fuel 103 is introduced to the cylindrical passages 32 are located at a substantially equal distance from the exits of the cylindrical passages 32.

The air introduction passages 35 are passages which guide the compressed air 102 to the cylindrical passages 32. As shown in FIG. 3, the first cylindrical section 30 is formed with air inlets 41A for the inner cylindrical passages 32A, while the second cylindrical section 31 is formed with air inlets 41B for the outer cylindrical passages 32B. The air inlets 41A, 41B extend in the axial direction and are formed in a slit shape. As shown in FIG. 4, the air introduction passages 35 connect the air inlets 41A formed in the first cylindrical section 30 to the inner cylindrical passages 32A, and connect the air inlets 41B formed in the second cylindrical section 31 to the outer cylindrical passages 32B. In this structure, the compressed air 102 outside the supplemental fuel injectors 23 can be introduced to the cylindrical passages 32.

As shown in FIG. 4, the air introduction passages 35 are located upstream of the fuel injection passages 34 (the fuel injection ports 40). In this structure, the compressed air 102 is guided to the regions of the cylindrical passages 32 that are upstream of the regions of the cylindrical passages 32 to which the fuel 103 is introduced. Therefore, the fuel 103 is injected into the combustion chamber 26 together with the compressed air 102 in such a manner that the fuel 103 is pushed out by the compressed air 102.

Figure 8:
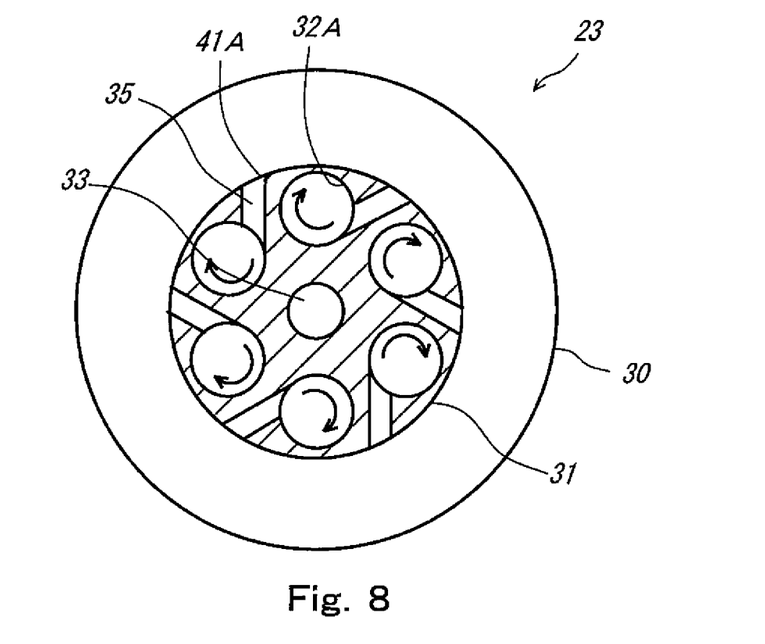
FIG. 8 is a cross-sectional view taken in the direction of arrows along line B-B of FIG. 4.
Figure 9:
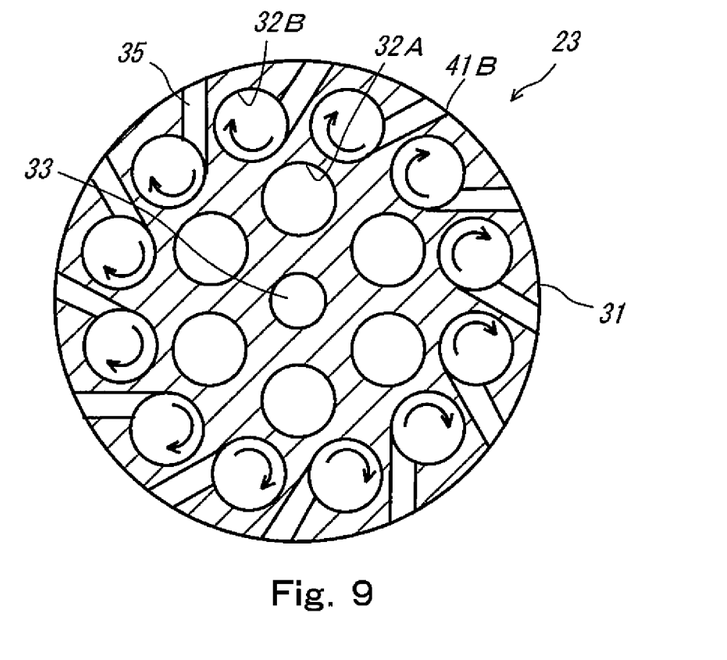
FIG. 9 is a cross-sectional view taken in the direction of arrows along line C-C of FIG. 4.

FIG. 8 is a cross-sectional view taken in the direction of arrows along line B-B of FIG. 4. FIG. 9 is a cross-sectional view taken in the direction of arrows along line C-C of FIG. 4. As shown in FIGS. 8 and 9, the air introduction passages 35 are connected to the cylindrical passages 32, respectively in such a manner that the air introduction passages 35 extend in the tangential directions of the cylindrical passages 32, in cross-sectional views, respectively. Therefore, in cross-sectional views (transverse sectional views) perpendicular to the center axes of the cylindrical passages 32, the compressed air 102 can be guided to the cylindrical passages 32 from the tangential directions of the cylindrical passages 32, respectively. Thus, the compressed air 102 having been introduced to the cylindrical passages 32 is injected into the combustion chamber 26 while swirling (swirling in the clockwise direction in FIGS. 8 and 9) along the inner peripheral surfaces of the cylindrical passages 32.

Figure 10:
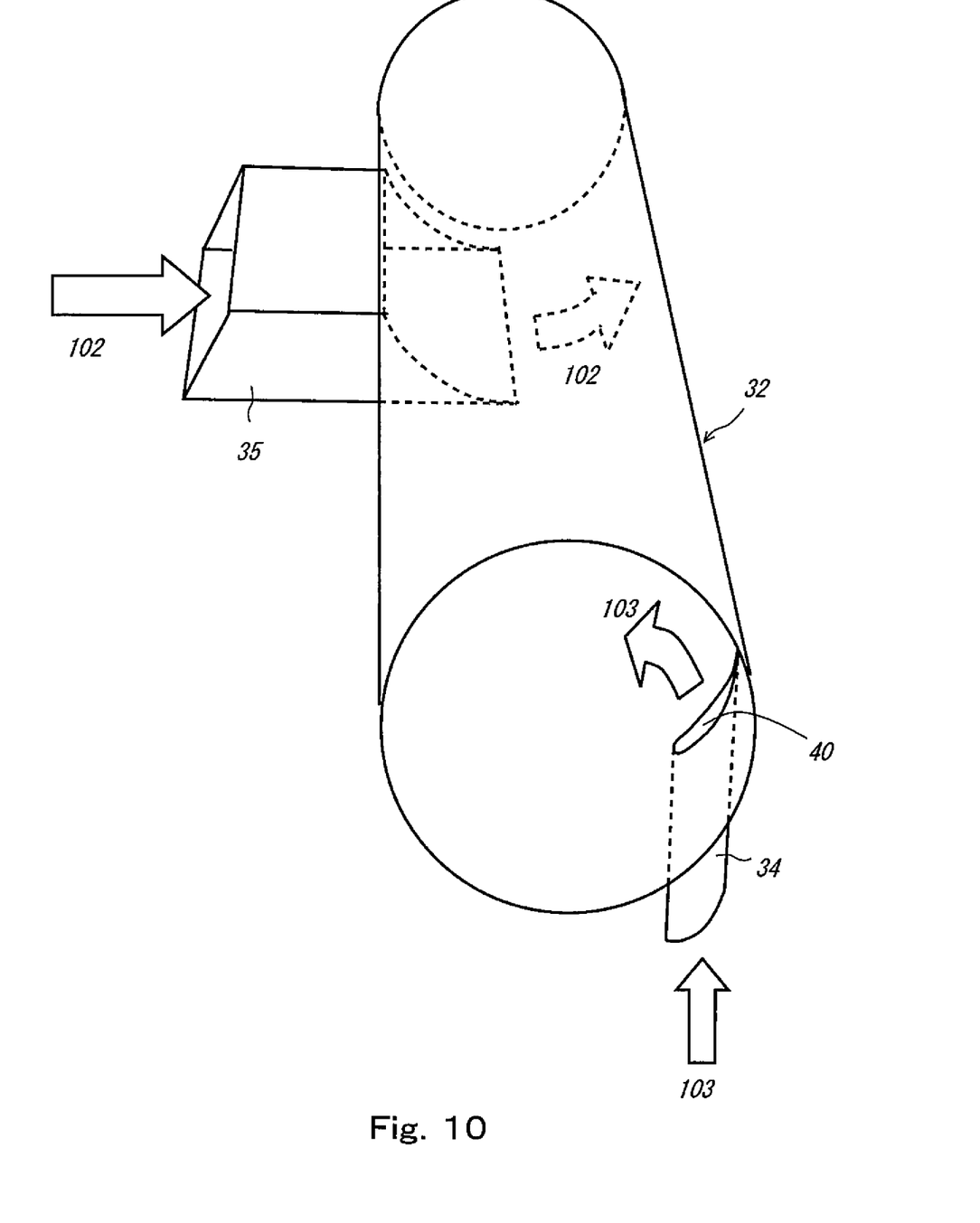
FIG. 10 is a view showing a positional relationship between the fuel introduction passage and an air introduction passage.

FIG. 10 is a view showing a positional relationship between the fuel introduction passage 34 and the air introduction passage 35, when viewed from the perspective of the combustion chamber 26. In the example of FIG. 10, the fuel introduction passage 34 is connected to the right side of the cylindrical passage 32 in FIG. 10, while the air introduction passage 35 is connected to the lower side of the cylindrical passage 32 in FIG. 10. The fuel 103 is introduced to the right side of the cylindrical passage 32 in FIG. 10 through the lower side in FIG. 10, and swirls in a counterclockwise direction along the inner peripheral surface of the cylindrical passage 32. In contrast, the compressed air 102 is introduced to the lower side of the cylindrical passage 32 in FIG. 10 through the left side in FIG. 10, and swirls in the counterclockwise direction along the inner peripheral surface of the cylindrical passage 32. In this way, in the present embodiment, the compressed air 102 swirls in the same direction as that of the fuel 103. Therefore, in the present embodiment, the fuel 103 can swirl more easily and hence can be formed in the sheet shape more easily, as compared to, for example, a case where the compressed air 102 flows linearly in the axial direction.

Each of the air introduction passages 35 extends in a direction perpendicular to the center axis of the cylindrical passage 32. Unlike in the case of the fuel 103, even when the compressed air 102 which is swirling and the compressed air 102 which is introduced to the cylindrical passage 32 interfere with each other, this affects less the formation of the fuel 103 in the sheet shape.

The present embodiment has been described above. As described above, since the fuel 103 is formed in the sheet shape in the present embodiment, a distance between the outer surface of the fuel 103 and the center of the fuel 103 is short, and combustion reaction time of the fuel 103 is short. As a result, generation of NOx can be suppressed.

Although in the above-described embodiment, the air introduction passages 35 are connected to the cylindrical passages 32, respectively in such a manner that the air introduction passages 35 extend in the tangential directions of the cylindrical passages 32, in transverse sectional views, respectively, so that the compressed air 102 swirls in the same direction as that of the fuel 103 in the interiors of the cylindrical passages 32, the configuration of the air introduction passages 35 is not limited to this. For example, the air introduction passages 35 may include swirlers provided on the outer peripheries of the cylindrical passages 32, respectively to allow the compressed air 102 to swirl in the same direction as that of the fuel 103 in the interiors of the cylindrical passages 32.

Although in the above-described embodiment, the fuel injector 23 includes the plurality of cylindrical passages 32, the plurality of fuel introduction passages 34, and the plurality of air introduction passages 35, the fuel injector 23 may not include the plurality of these passages. For example, the fuel injector 23 may include one cylindrical passage 32, one fuel introduction passage 34 and one air introduction passage 35.

Although in the above-described embodiment, the cylindrical passages 32, the fuel passage 33, and the fuel introduction passages 34 are formed in the first cylindrical section 30 and the second cylindrical section 31, the passages 32 to 34 may not be formed in the same members. For example, the passages 32 to 34 may be formed by independent pipe members, respectively, and coupled to each other to construct the fuel injector 23.

Although in the above-described embodiment, the fuel injector 23 is used in the gas turbine 100, the fuel injector 23 may be used in a boiler, an absorption chiller, or the like, as well as the gas turbine.

INDUSTRIAL APPLICABILITY

In accordance with the fuel injector of the present invention, the generation amount of NOx can be reduced, and the occurrence of a flashback flame can be suppressed. Therefore, the fuel injector of the present invention is useful in the technical field of the fuel injector.

REFERENCE SIGNS LIST 22 main fuel injector
23 supplemental fuel injector
26 combustion chamber
32 cylindrical passage
32A inner cylindrical passage
32B outer cylindrical passage
34 fuel introduction passage
34A first fuel introduction passage
34B second fuel introduction passage
34C third fuel introduction passage
35 air introduction passage
40 fuel introduction port
100 gas turbine
102 compressed air
103 fuel

The invention claimed is:
1. A fuel injector comprising:
a cylindrical passage which opens in a combustion chamber;
an air introduction passage which guides compressed air to the cylindrical passage at a location that is upstream of a location at which fuel is introduced to the cylindrical passage; and a fuel introduction passage, which guides the fuel to a region of the cylindrical passage and is closer than the air introduction passage to the combustion chamber, wherein the fuel introduction passage guides the fuel in a tangential direction of the cylindrical passage in a transverse sectional view, and the air introduction passage has a configuration which causes the compressed air to swirl in the same direction as a direction in which the fuel swirls, in an interior of the cylindrical passage.

2. The fuel injector according to claim 1, wherein the fuel introduction passage guides the fuel in a direction that is inclined toward the combustion chamber with respect to a direction perpendicular to a center axis of the cylindrical passage.

3. A fuel injector comprising:

a plurality of cylindrical passages which open in a combustion chamber;

a plurality of air introduction passages which guide compressed air to the plurality of cylindrical passages, respectively, at locations that are upstream of locations at which fuel is introduced to the plurality of cylindrical passages; and a plurality of fuel introduction passages which guide the fuel to regions of the plurality of cylindrical passages, respectively, and are closer than the plurality air introduction passages to the combustion chamber, wherein the fuel introduction passages guide the fuel in tangential directions of the cylindrical passages, in transverse sectional views, respectively, and each of the plurality of air introduction passages has a configuration which cause the compressed air to swirl in the same direction as a direction in which the fuel swirls, in an interior of the respective cylindrical passage.

4. A gas turbine comprising the fuel injector as recited in claim 1.

5. The fuel injector according to claim 1, wherein the air introduction passage guides the compressed air in the tangential direction of the cylindrical passage in the transverse sectional view.

6. The fuel injector according to claim 3, wherein the air introduction passages guide the compressed air in the tangential directions of the cylindrical passages in the transverse sectional views, respectively.

* * * * *